Patented Apr. 12, 1938

2,113,584

UNITED STATES PATENT OFFICE 2,113,584

PROCESS FOR PRODUCING RESINOUS REACTION PRODUCTS OF SULPHUR DIOXIDE AND OLEFINS

Louis H. Fitch, Jr., and Frederick E. Frey, Bartlesville, Okla., assignors to Phillips Petroleum Company, Bartlesville, Okla., a corporation of Delaware No Drawing. Application October 19, 1933, Serial No. 694,350

9 Claims. (Cl. 260—2)

The present application is a continuation-in-part of our co-pending application Serial No. 652,771, filed January 20, 1933, which is in turn a division of our co-pending application Serial No. 599,350, filed March 16, 1932.

The present invention relates to the catalytic preparation of resinous reaction products of sulphur dioxide and olefins, and to catalysts for effecting such reactions.

A primary object of the invention is the provision of catalysts adapted to enhance the reaction between sulphur dioxide and olefins, and to cause such reaction to take place rapidly even in complete darkness.

Additional objects will become apparent as the description of the invention proceeds.

While the reaction between sulphur dioxide and certain olefins to form a resin-like product is known, the reaction as therein described, takes place readily only in the presence of sunlight or some other source of actinic light.

Heat alone has been found to be of but limited effectiveness in bringing about interaction between sulphur dioxide and olefins to form a resin-like product. Many olefins which react rapidly with sulphur dioxide in the presence of light, do not react readily in the dark, even at temperatures somewhat in excess of 100° C.

According to the present invention, the reaction can be made to take place in complete darkness in the presence of small amounts of chemical agents which exert a catalytic effect. It has been found by the addition of suitable catalysts, the preparation of resinous reaction products of sulphur dioxide and olefins may be effected at low temperatures in comparatively short reaction times, and in the absence of means for providing actinic light. The catalysts, however, are also effective in conjunction with elevated temperatures and/or light.

The catalysts which are suitable for catalyzing the reaction between sulphur dioxide and olefins under the conditions outlined are oxygen, organic peroxides, salts of silver and monovalent copper, nitric oxide, and nitrogen dioxide. Silver sulphate and sulphite also catalyze the reaction. Cuprous chloride is a catalyst for the reaction.

For example, 2-butene and sulphur dioxide were sealed in liquid mixture in a glass tube with one-half of one per cent by weight of benzoyl peroxide in solution. The reagents were completely converted into a solid resin on standing for three days in the dark at 80° F. Under the same conditions, in the absence of a catalyst, 2-butene and sulphur dioxide failed to react to any appreciable extent in the course of three months.

With the same materials and conditions, small quantities of another peroxide, diethyl peroxide, induced the complete conversion of the reagents to resin in four days. Small quantities of silver nitrate induced the reaction to completion in thirty minutes.

The aforementioned catalysts have been found useful in inducing and accelerating the reaction of other olefins such as ethylene, propylene, butene-1, pentene-1, hexene-1, and isopropyl ethylene, with sulphur dioxide both in the presence and absence of light and diluents. The reaction of diolefins such as 1,3-butadiene and cyclopentadiene with sulphur dioxide is likewise accelerated by these catalysts.

The products obtained when using the catalysts are similar to those obtained when the reaction is carried out in the presence of light alone. In some cases, however, they may exhibit differences in softening temperatures and other physical characteristics, these differences being apparently due to differences in the stage of polymerization of the product, and not to the inclusion of the catalyst in the product as an impurity. Regardless of how produced, they usually form as a glassy, viscous material in the presence of an excess of sulphur dioxide which dissolves the resin, except in the case of ethylene, propylene and some dienes, which yield a resin insoluble in sulphur dioxide.

The catalytic polymerization of these materials is not primarily a reaction at the surface of the catalyst, but is principally due to the presence of catalyst dissolved in the olefin-$SO_2$ mixture. Particularly is this noticeable in the inorganic salts, many of which, especially nitrates, exhibit marked catalytic effect upon the polymerization, but have a low solubility in sulphur dioxide, especially when it is mixed with hydrocarbons. For example, we find that a crystal of silver nitrate, if left in a sulphur dioxide-propylene mixture without agitation, soon becomes coated with a little reaction product which completely prevents its further action as a catalyst, whereas a similar amount of the nitrate in sulphur dioxide or alcohol solution will cause reaction to take place throughout the mixture with great rapidity and considerable evolution of heat.

Where considerable quantites of saturated hydrocarbons are present in the reacting mixture, as for example, when a typical butane-butylene cut from an oil cracking operation is reacted with $SO_2$, these inorganic nitrate catalysts produce scarcely any reaction unless added to the reaction mixture in conjunction with a liquid acting as a medium for increasing their solubility in the reacting mixture.

Such liquids need not necessarily be used in large quantities, successive dispersion of small quantities of solutions of catalyst throughout the reaction mixture usually accomplishing the desired effect.

If, for example, solid silver nitrate is added to a mixture consisting of two parts liquid $SO_2$, one part chain butenes, and three parts butane, no appreciable reaction takes place in the dark in two weeks, but if the same quantity of silver nitrate dissolved in six parts of alcohol, acetone, liquid sulphur dioxide or similar solvent be added to the above mixture, a considerable quantity of reaction product will have formed in one or two days, and the addition of more of this catalytic solution at this time will induce further reaction provided the butenes in the original mixture are not yet largely converted into resinous product.

What is claimed and desired to be secured by Letters Patent is:

1. The method of producing high molecular weight heteropolymers, which comprises reacting olefins with sulphur dioxide in the presence of a catalyst consisting of an oxidizing substance of the group: oxygen, organic peroxides.

2. The method of producing high molecular weight heteropolymers, which comprises reacting olefins with sulphur dioxide in the presence of an organic peroxide.

3. The method of accelerating the reaction of sulphur dioxide with olefins to form high molecular weight heteropolymers, which comprises conducting the said reaction in the presence of a lower alkyl peroxide.

4. The method of accelerating the reaction of sulphur dioxide with olefins, which comprises conducting the said reaction in the presence of benzoyl peroxide.

5. The method of accelerating the reaction of sulphur dioxide with olefins to form high molecular weight heteropolymers, which comprises conducting the said reaction in the presence of free oxygen.

6. The method of producing high molecular weight heteropolymers, which comprises reacting olefins with sulphur dioxide in the presence of a catalyst consisting of an oxidizing substance of the group: oxygen, organic peroxides; and a liquid medium which increases the solubility of the said catalyst in the reaction mixture of olefins and sulphur dioxide.

7. The method of producing high molecular weight heteropolymers which comprises reacting olefins with sulphur dioxide in the presence of an organic peroxide and a lower aliphatic alcohol.

8. The method of producing high molecular weight heteropolymers which comprises reacting olefins with sulphur dioxide in the presence of an organic peroxide which is soluble in the liquid reaction mixture of olefins and sulphur dioxide.

9. The method of producing high molecular weight heteropolymers which comprises reacting olefins with sulphur dioxide in the presence of a lower aliphatic alcohol and a catalyst consisting of an oxidizing substance of the group: oxygen, organic peroxides.

LOUIS H. FITCH, Jr.
FREDERICK E. FREY.